United States Patent
Nonaka et al.

(10) Patent No.: US 10,410,054 B2
(45) Date of Patent: Sep. 10, 2019

(54) IMAGE PROCESSING DEVICE, METHOD AND PROGRAM TO ALIGN TWO IMAGES

(71) Applicant: FUJITSU LIMITED, Kawasaki-shi, Kanagawa (JP)

(72) Inventors: Yusuke Nonaka, Kawasaki (JP); Eigo Segawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/720,476

(22) Filed: Sep. 29, 2017

(65) Prior Publication Data
US 2018/0114061 A1 Apr. 26, 2018

(30) Foreign Application Priority Data
Oct. 24, 2016 (JP) ................. 2016-208168

(51) Int. Cl.
*G06K 9/00* (2006.01)
*G06T 7/207* (2017.01)
(Continued)

(52) U.S. Cl.
CPC ..... *G06K 9/00536* (2013.01); *G06K 9/00523* (2013.01); *G06K 9/6211* (2013.01);
(Continued)

(58) Field of Classification Search
CPC .. G06K 9/00013; G06K 7/10603; G06K 9/46; G06K 2009/6213; G06T 7/73;
(Continued)

(56) References Cited

U.S. PATENT DOCUMENTS

| | | | | |
|---|---|---|---|---|
| 2002/0051561 A1* | 5/2002 | Inagaki | ............... | G06T 7/0002 382/106 |
| 2002/0051563 A1* | 5/2002 | Goto | ................ | G01N 21/94 382/141 |

(Continued)

FOREIGN PATENT DOCUMENTS

| | | |
|---|---|---|
| JP | 2002-109518 | 4/2002 |
| JP | 2007-248364 | 9/2007 |

OTHER PUBLICATIONS

Naoki Chiba, et al., "Feature-Based Image Mosaicing," The IAPR Workshop on Machine Vision Applications, Nov. 17-19, 1998, Makuhari, Chiba, Japan, pp. 5-10.
(Continued)

*Primary Examiner* — Vu Le
*Assistant Examiner* — Guillermo M Rivera-Martinez
(74) *Attorney, Agent, or Firm* — Staas & Halsey LLP

(57) ABSTRACT

An image processing method causing an image processing device to execute a process including: obtaining a first image and a second image captured at different timings for an identical inspection target by passing through an imaging range of an image sensor row; extracting respective feature points of the first image and the second image; associating the feature points of the first image and the feature points of the second image with each other; estimating a conversion formula to convert the feature point of the second image to the feature point of the first image based on a restraint condition of a quadratic equation, in accordance with respective coordinates of three or more sets of the feature points associated between the first image and the second image; and converting the second image into a third image corresponding to the first image based on the estimated conversion formula.

10 Claims, 14 Drawing Sheets

(51) Int. Cl.
  *G06T 7/33*   (2017.01)
  *G06K 9/62*   (2006.01)
  *G06T 7/00*   (2017.01)

(52) U.S. Cl.
  CPC ............ *G06T 7/0002* (2013.01); *G06T 7/207* (2017.01); *G06T 7/33* (2017.01); *G06T 7/337* (2017.01); *G06K 2009/6213* (2013.01); *G06T 2207/10016* (2013.01); *G06T 2207/10024* (2013.01)

(58) Field of Classification Search
  CPC ........... G06T 7/70; G06T 7/0014; G06T 7/74; G06T 7/33
  See application file for complete search history.

(56) References Cited

U.S. PATENT DOCUMENTS

| | | | | |
|---|---|---|---|---|
| 2003/0091244 A1* | 5/2003 | Schnee | ............ | G06K 7/10732 382/321 |
| 2006/0140497 A1* | 6/2006 | Kondo | ............ | G06K 9/4609 382/254 |
| 2009/0067725 A1 | 3/2009 | Sasakawa et al. | | |
| 2009/0316135 A1* | 12/2009 | Stein | ............ | B25J 9/1674 356/27 |
| 2012/0019836 A1* | 1/2012 | Honma | ............ | G01B 11/2522 356/603 |
| 2013/0188024 A1* | 7/2013 | Givon | ............ | G03H 1/268 348/49 |
| 2014/0044460 A1* | 2/2014 | Kudo | ............ | G03G 15/5054 399/301 |
| 2014/0367468 A1* | 12/2014 | Saporetti | ............ | G06K 7/10792 235/440 |
| 2015/0371431 A1* | 12/2015 | Korb | ............ | G06T 9/00 382/113 |
| 2016/0188994 A1* | 6/2016 | Wu | ............ | G06T 7/593 382/195 |
| 2016/0300091 A1* | 10/2016 | Cumoli | ............ | G06K 7/10722 |
| 2017/0205809 A1* | 7/2017 | Sayyarrodsari | ............ | G05B 19/4155 |
| 2017/0243374 A1* | 8/2017 | Matsuzawa | ............ | G01B 11/00 |
| 2017/0358071 A1* | 12/2017 | Yamaoka | ............ | G06T 7/337 |

OTHER PUBLICATIONS

Naoki Chiba, et al., "Feature-Based Image Mosaicing," The IEICE Transactions vol. J82-D-II No. 10, Oct. 1999, pp. 1581-1589.

* cited by examiner

FIG. 2
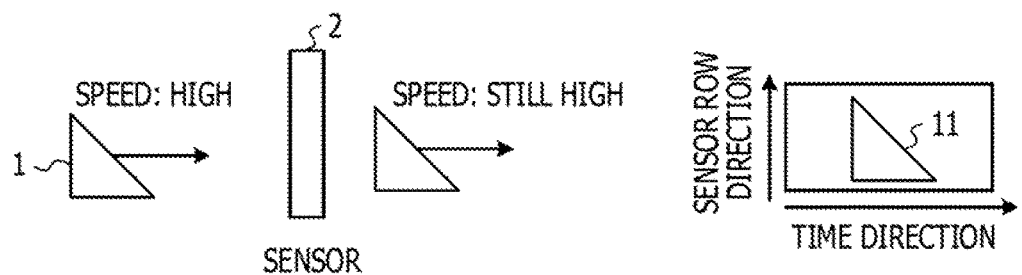
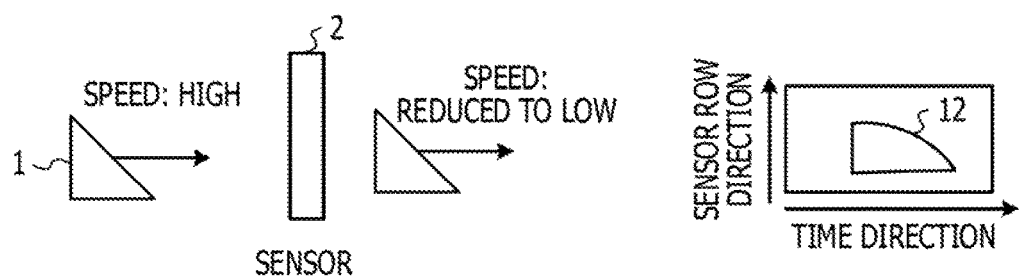

IMAGE PROCESSING DEVICE, METHOD AND PROGRAM TO ALIGN TWO IMAGES

CROSS-REFERENCE TO RELATED APPLICATION

This application is based upon and claims the benefit of priority of the prior Japanese Patent Application No. 2016-208168, filed on Oct. 24, 2016, the entire contents of which are incorporated herein by reference.

FIELD

The embodiments discussed herein are related to an image processing device, an image processing method, and an image processing program.

BACKGROUND

Load at the time of a check of the appearance of a building, a vehicle, and the like, is large because the check is mainly performed by visual recognition. In order to reduce the load due to the check, failure detection based on image processing has become attractive.

As a method of the failure detection, for example, there is a technology by which an image of a check target is captured in advance and set as a sample image, alignment of an inspection target image and the sample image is performed, and the images are compared. As a technology of the alignment, for example, in "Feature-Based Image Mosaicing", The IEICE Transactions Vol. J82-D-II No. 10, October in 1999, pp. 1581-1589, a technology is discussed by which one of a sample image and an inspection target image is aligned with the other image by extracting feature points of the sample image and the inspection target image and estimating a homography matrix used to perform coordinate conversion of corresponding feature points. In addition, similar related arts are discussed in Japanese Laid-open Patent Publication No. 2002-109518 and Japanese Laid-open Patent Publication No. 2007-248364.

However, there is a case in which an inspection target is moved for an image sensor row in which image sensors are arranged in array such as a line sensor when an image of the inspection target is captured by the image sensor row. When the inspection target is not moved at a fixed speed, a movement speed of the inspection target is different depending on a timing of imaging by the image sensor row, so that a distortion occurs in the captured image. The accuracy of the alignment is reduced by the distortion that has occurred in the image.

An object of the technology discussed herein is to accurately perform alignment of an image of an inspection target with a sample image even when the inspection target is not moved for an image sensor row at a fixed speed.

SUMMARY

According to an aspect of the invention, an image processing method causing an image processing device to execute a process including: obtaining a first image and a second image captured at different timings for an identical inspection target by passing through an imaging range of an image sensor row; extracting respective feature points of the first image and the second image; associating the feature points of the first image and the feature points of the second image with each other; estimating a conversion formula to convert the feature point of the second image to the feature point of the first image based on a restraint condition of a quadratic equation, in accordance with respective coordinates of three or more sets of the feature points associated between the first image and the second image; and converting the second image into a third image corresponding to the first image based on the estimated conversion formula.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a relationship between a passing speed of a target object and an imaging result;

DESCRIPTION OF EMBODIMENTS

Embodiments of the technology discussed herein are described below in detail.

(First Embodiment)

Figure 1:
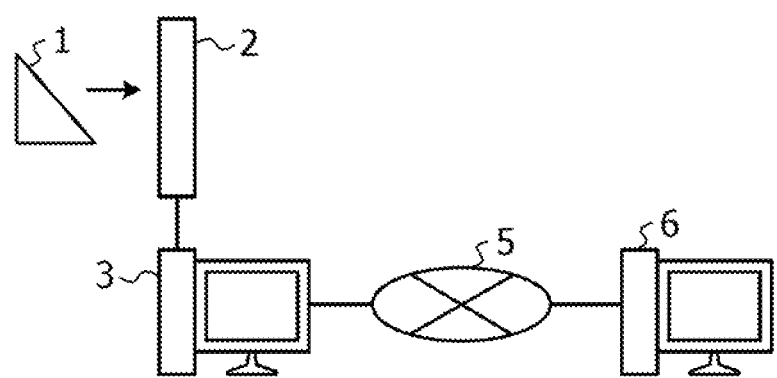
FIG. 1 is a functional block diagram illustrating an example of a usage form of an image processing device according to a first embodiment.

FIG. 1 is a functional block diagram illustrating an example of a usage form of an image processing device according to a first embodiment. In the block diagram of FIG. 1, an image processing device 3 is coupled to a line sensor 2, a communication network 5, and a communication terminal 6. It may be assumed that a system including the line sensor 2 and the image processing device 3 is an image processing system, or the image processing device 3 includes the line sensor 2.

In the embodiment, the line sensor 2 corresponds to an imaging element that one-dimensionally captures an image by an image sensor row in which one or more rows of image receiving elements are arranged. The line sensor 2 captures, at specific timings, an image of a target object 1 that passes through an image receiving area in a direction vertical to a direction in which the image receiving elements are arranged, and transmits the captured images to the image processing device 3. The image processing device 3 combines the received captured images into a single inspection target image. The image processing device 3 executes alignment processing of the combined inspection target image on a sample image that has been recorded in advance. The image processing device 3 may display the alignment processing result on a display or transmits the alignment processing result to the communication terminal 6 through the communication network 5. The system may be used to detect a change over time such as scratches or dirt by performing imaging on the same object at different time points or may be used to detect a defective product by sequentially comparing many items to be inspected with a reference article.

FIG. 2 is a diagram illustrating a relationship between a passing speed of a target object and an imaging result. When the target object 1 passes through the line sensor 2 at fixed speed, an image having the same shape as the target object 1 may be captured as represented in an image 11. In addition, when the speed at which the target object 1 passes through the line sensor 2 is not fixed, the shape is distorted as compared with the target object 1 as represented in an image 12. In a case in which a change in the speed of the target object 1 when the sample image is captured is different from a change in the speed of the target object 1 when the inspection target image is captured, a distortion of the shape of the target object 1 is different. Therefore, in comparison of the inspection target image and the sample image, a distortion of the image due to the movement speed becomes an error factor in image alignment processing.

Figure 3:
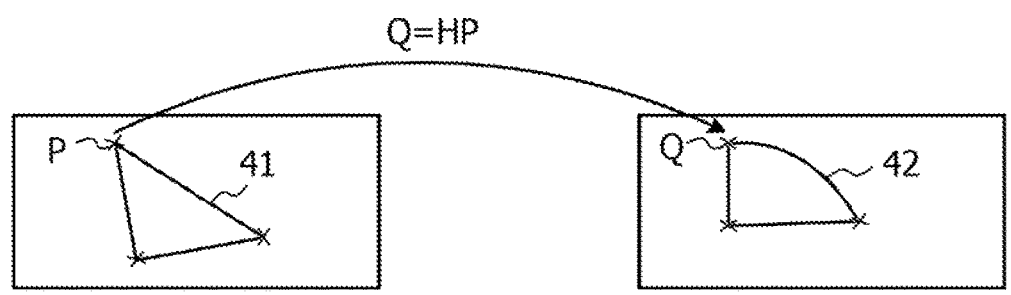
FIG. 3 is a diagram illustrating alignment of a sample image and an inspection target image.

FIG. 3 is a diagram illustrating alignment of a sample image and an inspection target image. In the embodiment, it is assumed that a vertex P of a sample image 41 and a vertex Q of an inspection target image 42 may be represented by "Q=HP" using a homography matrix H. "P" and "Q" are one-dimensional matrices (vectors) respectively representing points in two-dimensional images by a homogeneous coordinate expression. The first element and the second element of each of the one-dimensional matrices P and Q respectively correspond to an x coordinate and a y coordinate of the two-dimensional image, and the third element corresponds to "1". Further, the x axis is parallel to the alignment direction of sensors in the line sensor 2, while the y axis is vertical (or orthogonal) to the alignment direction of the line sensor 2.

In the alignment of two images, first, feature points are extracted from each of the sample image 41 and the inspection target image 42. A feature amount is calculated for each of the extracted feature points, and the feature points of the two images are associated with each other based on the calculated feature amounts. For the extraction of feature points and the calculation of feature amounts, an existing technology such as scale-invariant feature transform (SIFT) feature amount calculation, speeded up robust features (SURF) feature amount calculation, and the like by which an image is divided into a plurality of blocks, and vector conversion of a luminance change from one block to a peripheral block is performed, and the converted value is set as a feature amount.

A homography matrix H is estimated based on the feature points associated with each other for the two images. In a conventional homography matrix H, it has been assumed that two images are linearly convertible, so that the homography matrix H becomes a primary equation. Thus, when a distortion occurs in an image that has been captured by the line sensor 2 such as the inspection target image 42, it is difficult to perform the alignment by using the homography matrix H.

Therefore, in the embodiment, it is assumed that an acceleration of the target object 1 that passes through the line sensor 2 is fixed at the time of capturing of the inspection target image 42, and a conversion equation between two images using the homography matrix H is set as represented by (1). A formula related to a variable y becomes a quadratic equation in (1) because uniform accelerated motion may be represented by a quadratic equation of time.

$$\begin{pmatrix} X \\ k_1 Y^2 + k_2 Y + k_3 \\ 1 \end{pmatrix} = \begin{pmatrix} h_1 & h_2 & h_3 \\ h_4 & h_5 & h_6 \\ h_7 & h_8 & h_9 \end{pmatrix} \begin{pmatrix} x \\ k_4 y^2 + k_5 y + k_6 \\ 1 \end{pmatrix} \quad (1)$$

As represented in (1), the homography matrix H has variables from h1 to h9. In addition, the left side of the equation is the matrix Q, and the second term of the right side on the equation is the matrix P, and the matrices P and Q have variables from k1 to k6. The homography matrix has a freedom degree through constant multiplication, so that at least seven corresponding feature points are desired in order to obtain all of the variables.

In addition, the homography matrix H may be set as represented by (2). As represented in (2), when it is assumed that uniform accelerated motion is performed even in the x direction, the movement of the target object 1 that passes through the line sensor 2 may be further generalized.

$$\begin{pmatrix} k_1 X^2 + k_2 X + k_3 \\ k_4 Y^2 + k_5 Y + k_6 \\ 1 \end{pmatrix} = \begin{pmatrix} h_1 & h_2 & h_3 \\ h_4 & h_5 & h_6 \\ h_7 & h_8 & h_9 \end{pmatrix} \begin{pmatrix} k_7 x^2 + k_8 x + k_9 \\ k_{10} y^2 + k_{11} y + k_{12} \\ 1 \end{pmatrix} \quad (2)$$

As represented in (2), the homography matrix H has variables from h1 to h9, and the matrices P and Q have variables from k1 to k12. The homography matrix has a freedom degree of constant multiplication, so that at least 10 corresponding feature points are desired in order to obtain all of the variables. That is, the desired number of feature points is determined by the number of variables used for the restraint condition of the quadratic equation.

Here, when each of the variables is calculated based on the restraint condition of (1) or (2), in a section in which the speed of the target object 1 is changed due to the uniform accelerated motion, image alignment processing of the inspection target image 42 that has been captured by the line sensor 2 and the sample image 41 may be executed accurately.

Figure 4:
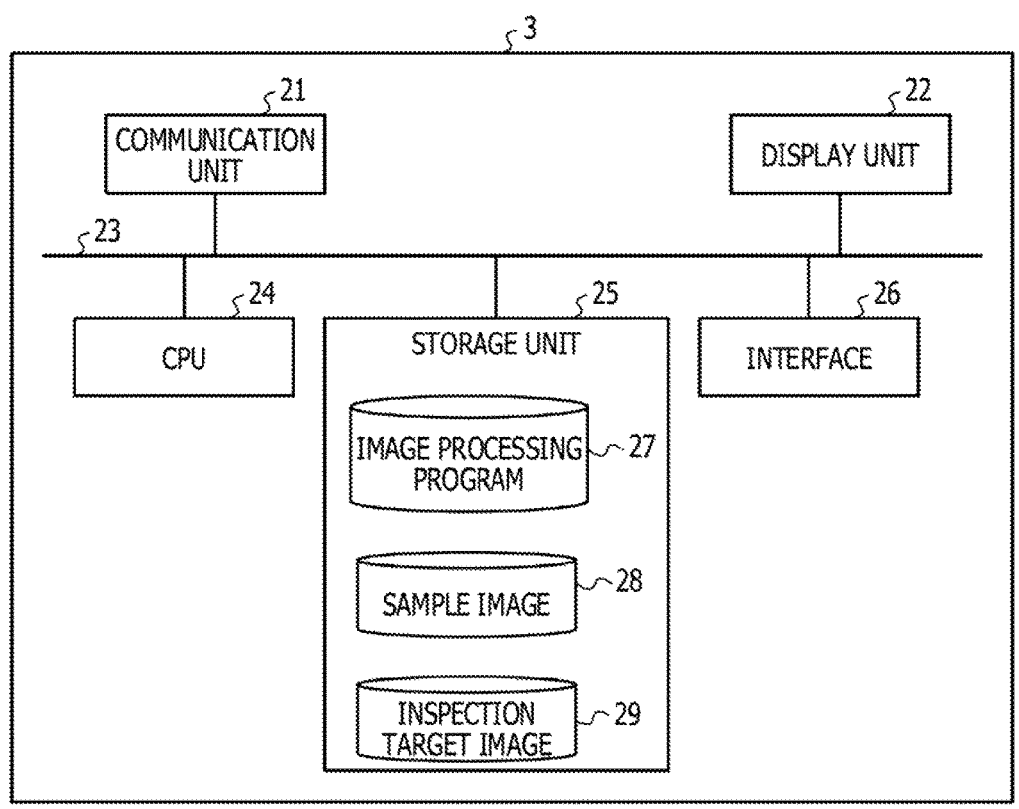
FIG. 4 is an example of a hardware block diagram illustrating the image processing device.

FIG. 4 is an example of a hardware block diagram illustrating the image processing device. The image processing device 3 includes a communication unit 21, a display unit 22, a CPU 24, a storage unit 25, and an interface 26. The CPU is an abbreviation for a central processing unit, and corresponds to an arithmetic processing device. The interface corresponds to a terminal used to transmit and receive singles to and from an external device. The communication unit 21, the display unit 22, the CPU 24, the storage unit 25, and the interface 26 are coupled to each other thorough a bus 23.

The communication unit 21 is an interface with a communication network when an image alignment processing result by the image processing device 3 is transmitted externally. The communication unit 21 may execute modulation/demodulation processing, analog-to-digital conversion processing, and the like, which are desired for the communication.

The display unit 22 is a device used to visually display the image alignment processing result by the image processing device 3. The display unit 22 may function as an interface used to transmit a drawing signal to an image display device such as a display coupled externally.

The CPU 24 is an arithmetic processing device used to execute a program stored in the storage unit 25. A part of a function requested for the CPU 24 may be executed by a graphics processing unit (GPU) or a digital signal processor (DSP).

The storage unit 25 stores an image processing program 27, a sample image 28, and an inspection target image 29. The image processing device 3 may realize the function of the image processing device 3 by reading the image processing program 27 from the storage unit 25 and causing the CPU 24 to execute the image processing program 27. The image processing device 3 reads the sample image 28 and the inspection target image 29 in the image alignment processing. The image processing device 3 writes the image alignment processing result into the storage unit 25.

The interface 26 is an interface used to transmit and receive signals to and from an external device. In the embodiment, the image processing device 3 is coupled to the line sensor 2 through the interface 26. The image processing device 3 writes image data that has been received from the line sensor 2 through the interface 26 into the storage unit 25 as the inspection target image 29.

As described above, the image processing device 3 may realize the function as an image processing device by executing the image processing program 27 stored in the storage unit.

Figure 5:
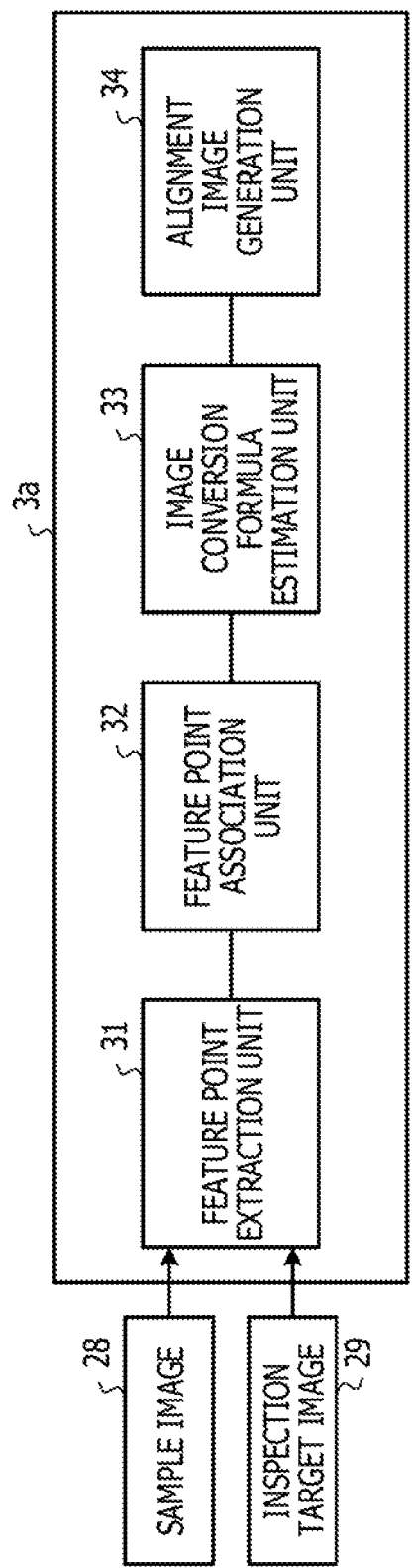
FIG. 5 is a functional block diagram illustrating the image processing device.

FIG. 5 is a functional block diagram illustrating the image processing device. An image processing device 3a includes a feature point extraction unit 31, a feature point association unit 32, an image conversion formula estimation unit 33, and an alignment image generation unit 34. Each of the function blocks in the image processing device 3a is realized when the CPU 24 executes the image processing program 27.

The feature point extraction unit 31 receives a sample image 28 and an inspection target image 29, and extracts feature points of each of the images. The feature point association unit 32 associates the feature points that have been extracted by the feature point extraction unit 31 with each other based on feature amounts of the respective feature points.

For example, in FIG. 3, in the sample image 41 and the inspection target image 42, corresponding vertexes of triangles are associated with each other as feature points. In the association of the feature points, a threshold value between feature amounts used to associate the feature points with each other is set, and when a difference between the two feature amounts is the threshold value or less, the two feature points may be determined to correspond to each other. As described above, examples of the technology for extraction of feature points and calculation of future amounts include the SIFT feature amount calculation technology and the SURF feature amount calculation technology.

The image conversion formula estimation unit 33 sets a determinant, based on the feature points that have been associated with each other by the feature point association unit 32 and the above-described (1) or (2), and calculates coefficients in (1) or (2). The image conversion formula estimation unit 33 estimates an image conversion formula from the sample image to the inspection target image based on the calculated coefficients.

The alignment image generation unit 34 executes alignment calculation of the sample image and the inspection target image, based on the image conversion formula that has been estimated by the image conversion formula estimation unit 33.

As described above, the image processing device 3a may realize alignment of the sample image and the inspection target image based on the extracted feature points even when a distortion occurs in the inspection target image.

Figure 6:
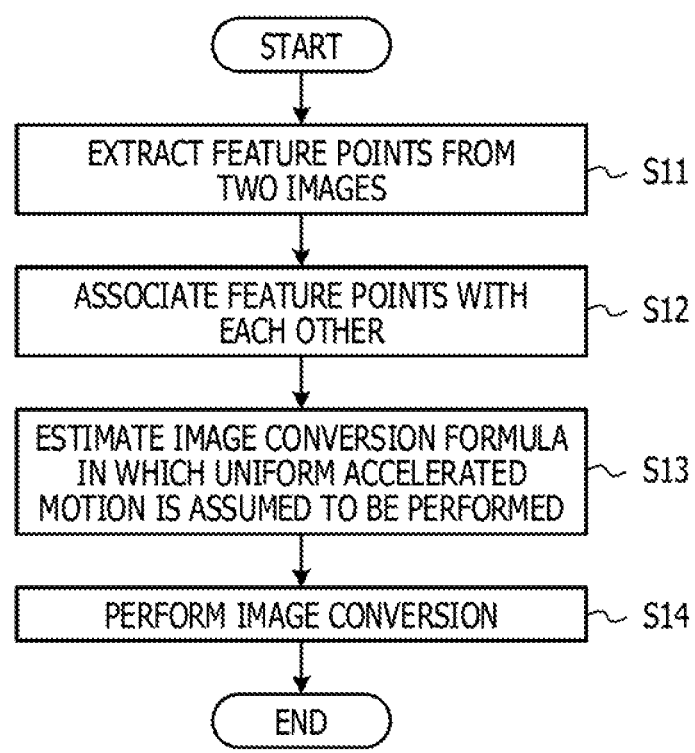
FIG. 6 is an image alignment processing flow by the image processing device.

FIG. 6 is an image alignment processing flow by the image processing device. The image alignment processing is realized when the image processing program 27 stored in the storage unit 25 is read and executed by the CPU 24.

The image processing device 3a extracts feature points from two images such as a sample image and an inspection target image (Step S11). The image processing device 3a associates feature points with each other based on feature amounts of the respective extracted feature points (Step S12). The image processing device 3a calculates each coefficient of the above-described image conversion formula based on the above-mentioned image conversion formula in which uniform accelerated motion is assumed to be performed, and estimates the image conversion formula based on each of the calculated coefficients (Step S13). The image processing device 3a performs image conversion so that alignment of the sample image and the inspection target image is performed, based on the estimated image conversion formula (Step S14).

As described above, the image processing device 3a may realize the image alignment processing by setting the image conversion formula in which uniform accelerated motion is assumed to be performed even when the capturing rate of the inspection target image is not fixed.

(Second Embodiment)

Figure 7:
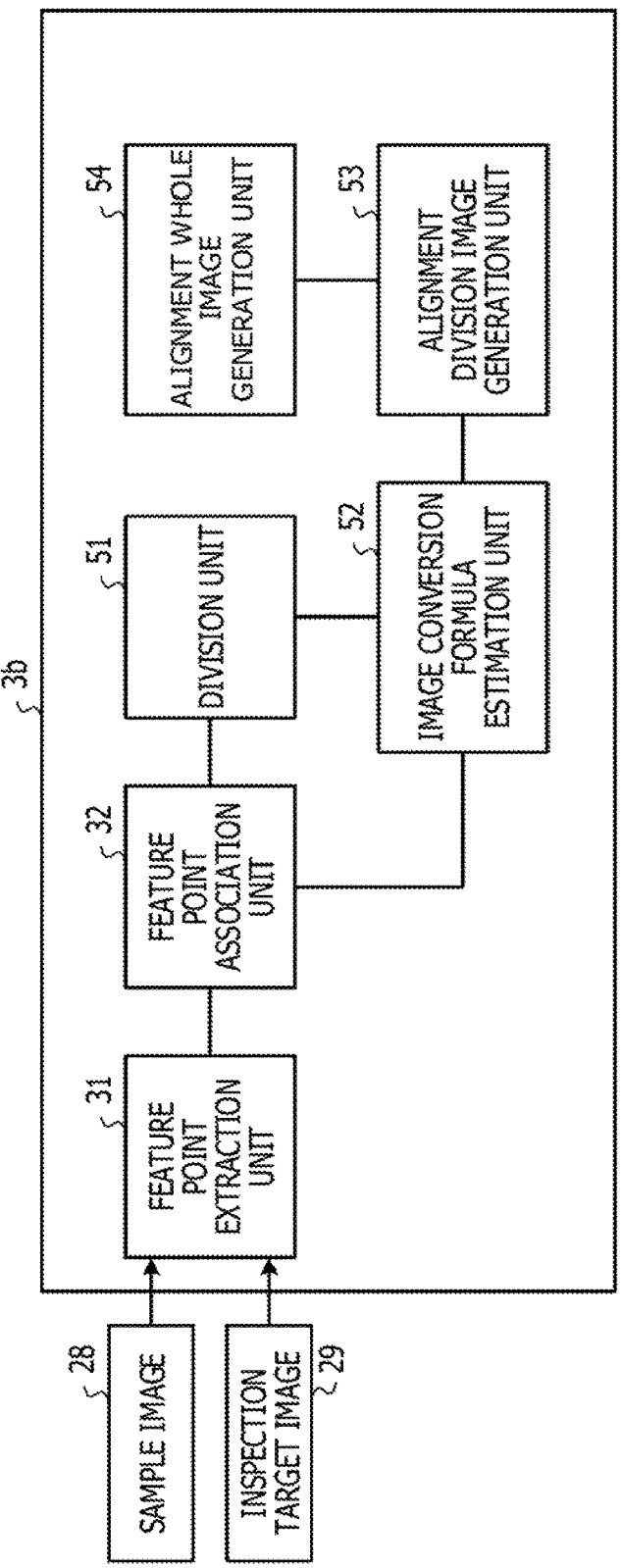
FIG. 7 is a functional block diagram illustrating an image processing device according to a second embodiment.

FIG. 7 is a functional block diagram illustrating an image processing device according to a second embodiment. An image processing device 3b includes a feature point extraction unit 31, a feature point association unit 32, a division unit 51, an image conversion formula estimation unit 52, an alignment division image generation unit 53, and an alignment whole image generation unit 54.

The feature point extraction unit 31 receives a sample image 28 and an inspection target image 29, and extracts feature points of the images.

The feature point association unit 32 associates feature points that have been extracted by the feature point extraction unit 31 with each other, based on feature amounts of the respective feature points. For example, in FIG. 3, in the sample image 41 and the inspection target image 42, corresponding vertexes of triangles are associated with each other as the feature points. In the association of the feature points, a threshold value for the feature amounts used to associate the feature points with each other is set, and when a difference between the two feature amounts is the threshold value or less, it may be assumed that the two feature points are associated with each other.

The division unit 51 divides the inspection target image 29 at equal distances. The division condition may be set so that the specific number or more of feature points are included in a single divided area, or so that the inspection target image 29 may be divided into sufficiently small areas which can be assumed to be areas that are changing at uniform acceleration. The detail of the division processing is described later.

The image conversion formula estimation unit 52 sets a determinant for each of the areas that have been divided by the division unit 51, based on the feature points that have been associated with each other by the feature point association unit 32 and the above-described (1) or (2), and calculates coefficients in (1) or (2). The image conversion formula estimation unit 52 estimates an image conversion formula from the sample image to the inspection target image, based on the calculated coefficients.

The alignment division image generation unit 53 performs alignment calculation of each of the divided inspection target images on the sample image, based on the image conversion formula that has been estimated by the image conversion formula estimation unit 52.

The alignment whole image generation unit 54 combines the divided inspection target images the alignment calculation of which has been performed on the sample image by the alignment division image generation unit 53 to generate a single inspection target image corresponding to the sample image.

As described above, the image processing device 3b may realize alignment of the sample image and the inspection target image based on the extracted feature points by dividing the image into sufficiently small areas in each of which the acceleration is assumed to be fixed even when the acceleration is not fixed, which results in distortion of the inspection target image.

Figure 8:
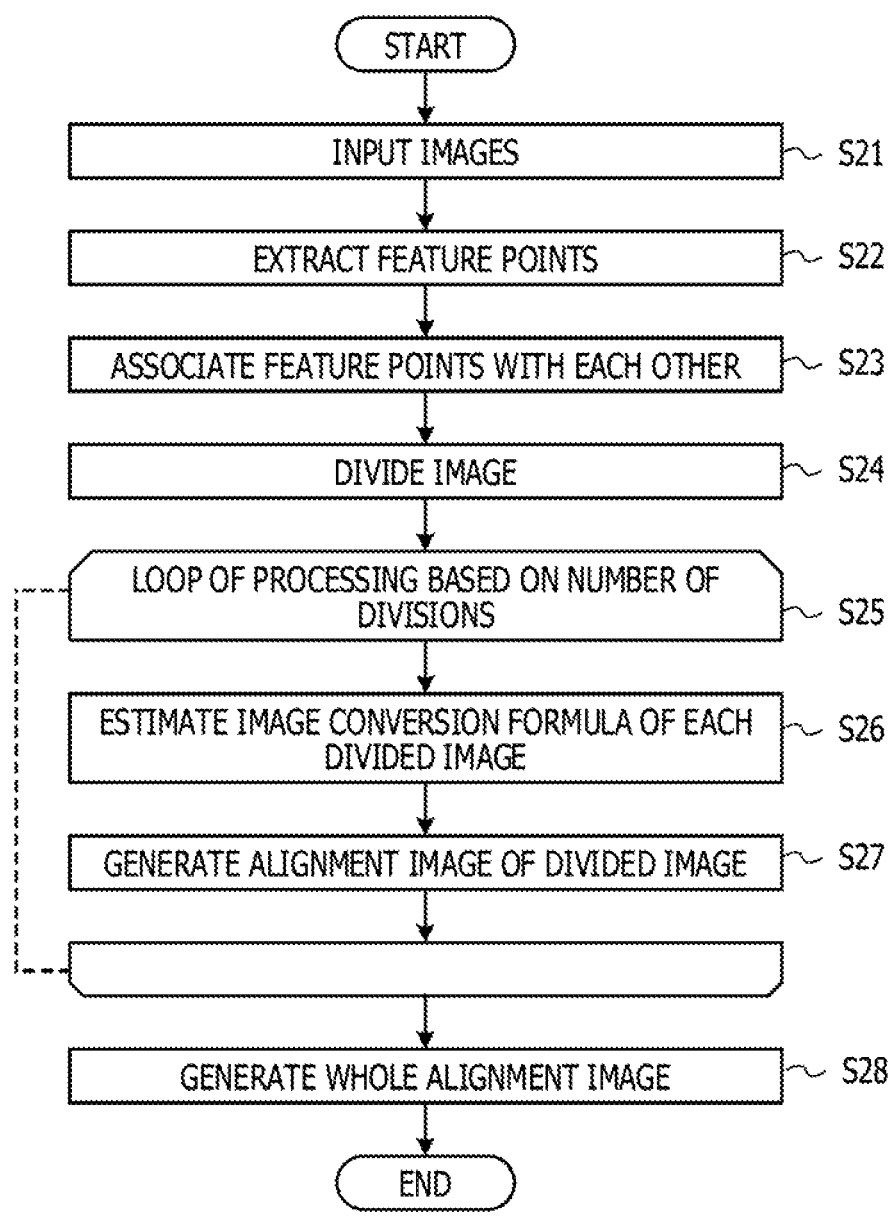
FIG. 8 is an image alignment processing flow by the image processing device according to the embodiment.

FIG. 8 is an image alignment processing flow of the image processing device according to the embodiment. In FIG. 8, the image processing device 3b receives image inputs of a sample image and an inspection target image (Step S21). The image processing device 3b executes extraction processing of feature points for the received sample image and inspection target image (Step S22). The image processing device 3b associates feature points with each other, for the respective extracted feature points (Step S23). The image processing device 3b performs division of the inspection target image under a specific condition (Step S24).

The image processing device 3b repeats processing of Steps S26 and S27 based on the number of divisions of the inspection target image (Step S25). The image processing device 3b estimates an image conversion formula for each of the divided images (Step S26). The image processing device 3b generates an alignment image that has been obtained by aligning each of the divided images with the sample image, based on the estimated image conversion formula (Step S27).

The image processing device 3b combines the alignment images that have been respectively generated for the divided images to generate the whole alignment image (Step S28).

As described above, the image processing device 3b may realize alignment of the sample image and the inspection target image based on the extracted feature points by dividing the image into sufficiently small areas in each of which the acceleration is assumed to be fixed even when the acceleration is not fixed, which results in distortion of the inspection target image.

Figure 9:
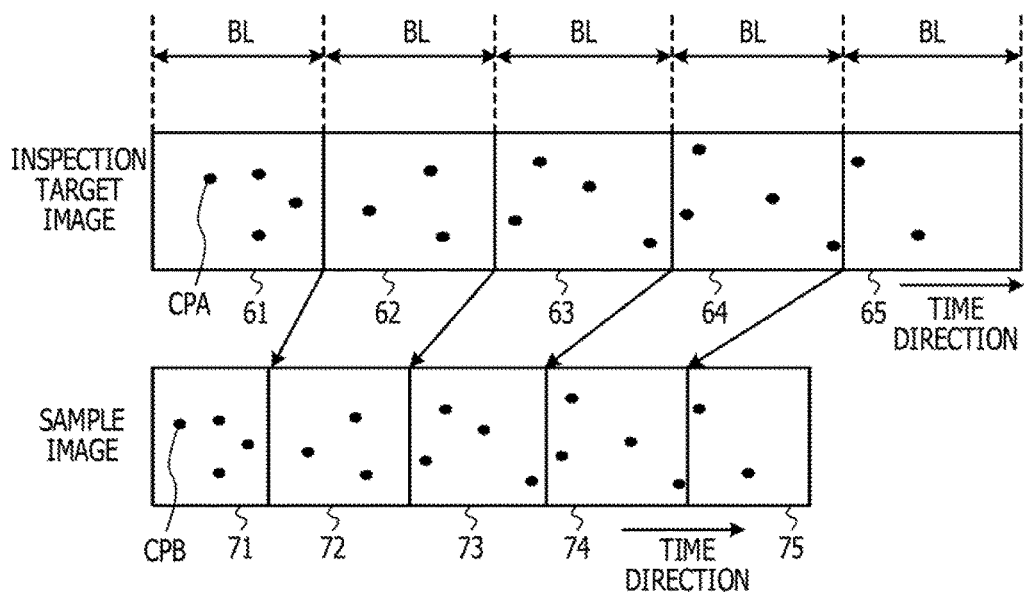
FIG. 9 is a diagram illustrating an example of the image division in the embodiment.

FIG. 9 is a diagram illustrating an example of the image division in the embodiment. In FIG. 9, an inspection target image includes divided images 61 to 65 that have been divided at equal distances BL in a time direction. Feature points CPA are included in each of the divided images.

The sample image includes feature points CPB respectively corresponding to the feature points CPA of the inspection target image. The image processing device 3b determines a division width of the sample image so that all feature points CPB corresponding to the feature points CPA in each of the divided images of the inspection target images are included in each of corresponding divided areas of the sample image.

The image processing device 3b respectively associates the divided images 61 to 65 of the inspection target image with divided images 71 to 75 of the sample image, and estimates an image conversion formula. The image processing device 3b executes the image alignment processing for each of the divided images, based on the estimated image conversion formula.

It is desirable that the division width BL of the inspection target image is sufficiently reduced so that an acceleration change at the time of reading of the inspection target image is allowed to be ignored. On the other hand, as the division width BL is reduced, the number of divisions increases, so that a processing load of the image alignment processing increases. In addition, when the number of the feature points CPA included in each of the divided images 61 to 65 is small, it may be difficult to calculate coefficients in the estimation of the image conversion formula. As described above, seven feature points are desired for the coefficient calculation in (1), and 10 feature points are desired for the coefficient calculation in (2). Thus, it is desirable that a division width BL is set sufficiently large so as to include the number of feature points desired for the estimation of the applied image conversion formula, and the division width BL is set small so that an acceleration change is allowed to be ignored.

Figure 10:
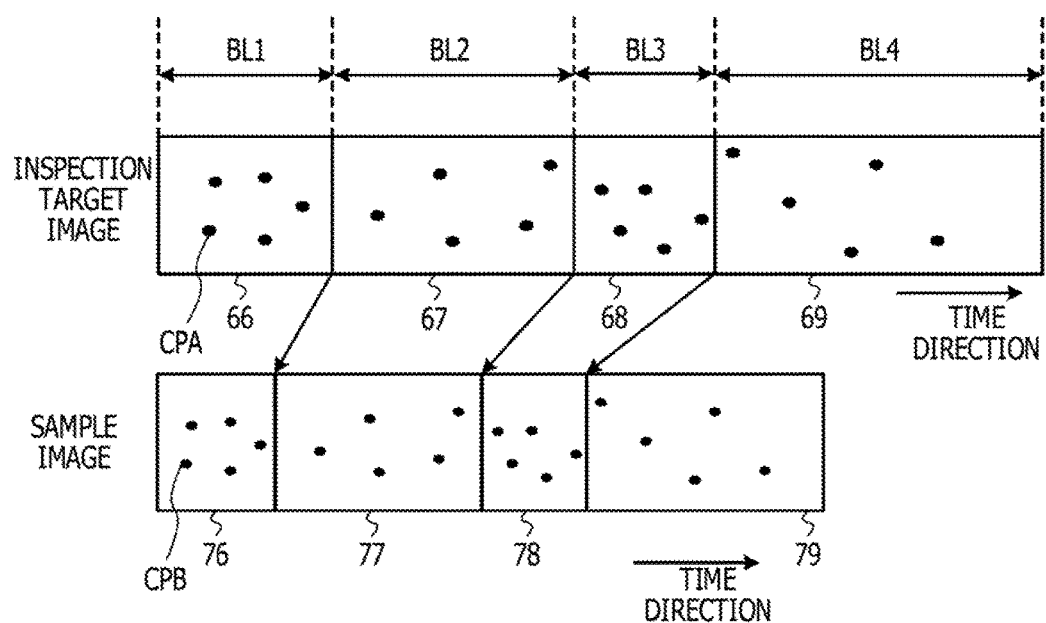
FIG. 10 is a diagram illustrating another example of the image division in the embodiment.

FIG. 10 is a diagram illustrating another example of the image division according to the embodiment. In FIG. 10, an inspection target image includes divided images 66 to 69 that have been divided at unequal distances BL1 to BL4 in a time direction. Feature points CPA are included in each of the divided images.

The sample image includes feature points CPB corresponding to the feature points CPA of the inspection target image. The image processing device 3b determines a division width of the sample image so that all of the feature points CPB corresponding to the feature points CPA in each of the divided images of the inspection target image are included in each of corresponding divided areas of the sample image.

The image processing device 3b respectively associates the divided images 66 to 69 of the inspection target image with divided images 76 to 79 of the sample image, and estimates an image conversion formula. The image processing device 3b executes the image alignment processing for each of the divided images based on the estimated image conversion formula.

As described above, seven feature points are desired for the coefficient calculation in (1), and 10 feature points are desired for the coefficient calculation in (2). In the embodiment, a minimum value of the number of feature points desired for each of the divided images is set in advance, and the division widths BL1 to BL4 are set so that the number of feature points included in each of the divided images becomes the minimum value or more. When the number of feature points included in each of the divided images is set at the minimum value or more at the time of generation of the divided images, an image conversion formula may be estimated.

(Third Embodiment)

Figure 11:
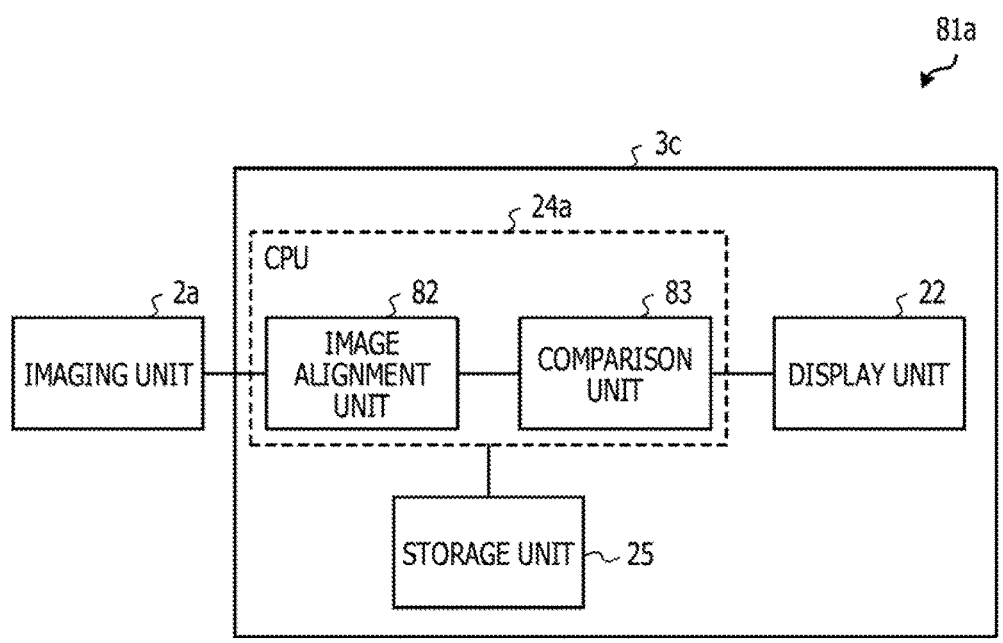
FIG. 11 is a functional block diagram illustrating an image processing system according to a third embodiment.

FIG. 11 is a functional block diagram illustrating an image processing system according to a third embodiment. An image processing system 81a includes an imaging unit 2a and an image processing device 3c.

The imaging unit 2a is a device used to capture an image that is an inspection target and transmit the captured image to the image processing device 3c. The imaging unit 2a is, for example, the above-described line sensor 2. In the embodiment, there is a case in which a distortion occurs in the image that has been captured through the imaging unit 2a due to a reason or the like in which a movement speed of the imaging target object is not fixed.

The Image processing device 3c includes a CPU 24a, a storage unit 25, and a display unit 22. The CPU 24a functionally realizes an image alignment unit 82 and a comparison unit 83 by executing a program stored in the storage unit 25. The image alignment unit 82 executes image alignment processing of a sample image that has been read from the storage unit 25 and an inspection target image that has been received from the imaging unit 2a. The image alignment processing by the image alignment unit 82 is the processing included in any one of the above-described embodiments. The image alignment unit 82 outputs the inspection target image for which the image alignment processing has been executed, to the comparison unit 83. The comparison unit 83 executes difference processing between the inspection target image after the image alignment processing and the sample image that has been read from the storage unit 25 to generate a difference image between the two images. The generation processing of the difference image by the comparison unit 83 may be executed when a program is executed by the CPU 24a, or may be executed when an arithmetic processing device such as a graphics processing unit (GPU) for image processing is provided separately. The comparison unit 83 outputs the generated difference image to the display unit 22. The difference image generation technology in the comparison unit 83 is discussed, for example, in "Robust Object Detection and Segmentation by Peripheral Increment Sign Correlation Image" The IEICE Transactions Vol. 184-D-II No. 12, December in 2001, pp. 2585-2594.

The display unit 22 is a display device used to display the input image data. The display unit 22 displays the difference image that has been generated by the comparison unit 83.

In the above-described configuration, the image processing system 81a may execute the comparison processing between the sample image and the inspection target image accurately and display the comparison result by executing the image alignment processing according to the embodiment even when a distortion occurs in the inspection target image obtained by the imaging unit 2a.

Figure 12:
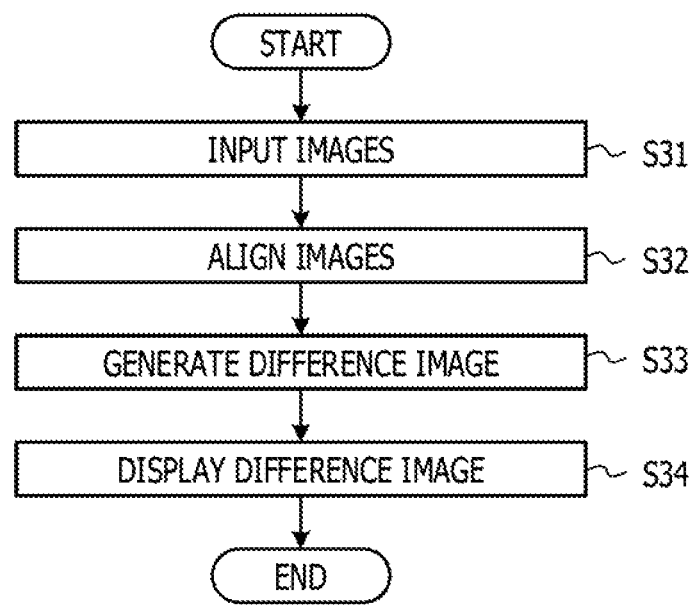
FIG. 12 is a processing flow of the image processing system.

FIG. 12 is a processing flow of the image processing system. In the image processing system 81a, an inspection target image that has been captured by the imaging unit 2a is input to the image processing device 3c (Step S31). The image processing device 3c executes the image alignment processing of the input inspection target image on a sample image stored in the storage unit 25 (Step S32). The image processing device 3c executes difference processing between the sample image and the inspection target image after the image alignment processing to generate a difference image (Step S33). The image processing device 3c displays the generated difference image on the display unit 22 (Step S34).

In the above-described processing, the image processing system 81a may execute the comparison processing of the sample image and the inspection target image that has been obtained by the imaging unit 2a accurately and display the comparison result even when a distortion occurs in the inspection target image.

(Fourth Embodiment)

Figure 13:
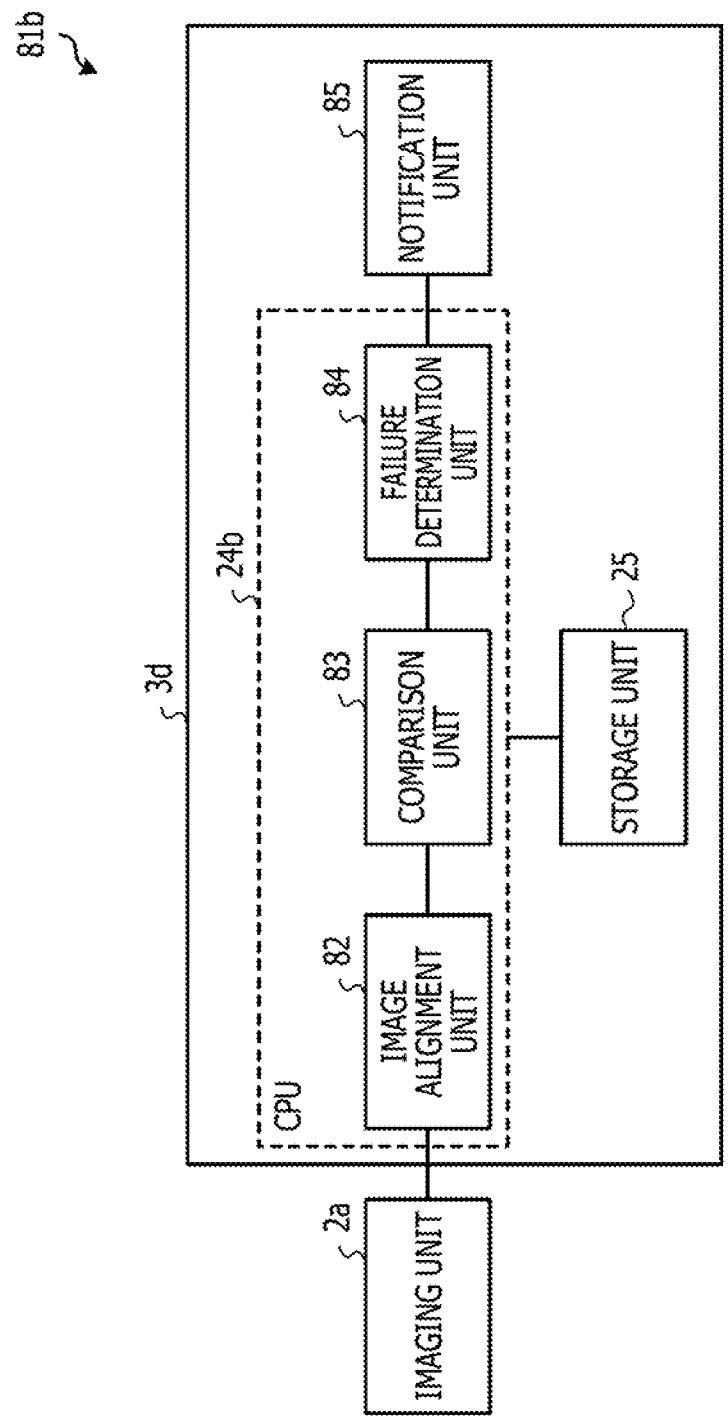
FIG. 13 is a functional block diagram illustrating an image processing system according to a fourth embodiment.

FIG. 13 is a functional block diagram illustrating an image processing system according to a fourth embodiment. In FIG. 13, an image processing system 81b includes an imaging unit 2a and an image processing device 3d. The imaging unit 2a is a device used to capture an image of an inspection target and transmits the captured image to the image processing device 3d. The imaging unit 2a is, for example, the above-described line sensor. In the embodiment, the image obtained through the imaging unit 2a may be distorted due to a reason or the like in which a movement speed of the captured target object is not fixed.

The image processing device 3d includes a CPU 24b, a storage unit 25, and a notification unit 85. The CPU 24b functionally realizes an image alignment unit 82, a comparison unit 83, and a failure determination unit 84 by executing a program stored in a storage unit 25. The image alignment unit 82 executes the image alignment processing of a sample image that has been read from the storage unit 25 and the inspection target image that has been received from the imaging unit 2a. The image alignment processing by the image alignment unit 82 is the processing included in any one of the above-described embodiments. The image alignment unit 82 outputs the inspection target image for which the image alignment processing has been executed, to the comparison unit 83. The comparison unit 83 executes the difference processing between the inspection target image after the image alignment processing and the sample image that has been read from the storage unit 25 to generate a difference image between the two images. The generation processing of the difference image by the comparison unit 83 may be realized when a program is executed by the CPU 24b, or may be executed when an arithmetic processing device such as a GPU for image processing is provided separately. The comparison unit 83 outputs the generated difference image to the failure determination unit 84.

The failure determination unit 84 executes failure determination processing based on the difference image that has been generated by the comparison unit 83. In the failure determination processing, for example, the difference image is divided into a plurality of areas, and a magnitude relation comparison with a threshold value that has been set in advance is performed for each of the divided areas, and when a value in a difference image of a certain area is the threshold value or more, a failure state is determined and a determination result is output. Here, the value of the difference image is, for example, a value set for specific color information. The failure determination may be performed by extracting a value related to the specific color information from the difference image and comparing it with the threshold value.

The notification unit 85 notifies the user of the failure determination result that has been input from the failure determination unit 84. The notification unit 85 is, for example, a display, and may display the failure determination result on a screen as a text message. In addition, the notification unit 85 may display a difference image in which a failure determination portion has been marked by the failure determination unit 84. For example, the image processing device 3d may be coupled to a network, and may transmit the failure determination result to another device through the notification unit 85.

In the above-described configuration, even when a distortion occurs in an inspection target image that has been obtained by the imaging unit 2a, the image processing system 81b may execute the failure determination processing for the inspection target image accurately and notify the user of the determination result by executing the image alignment processing according to the embodiment.

Figure 14:
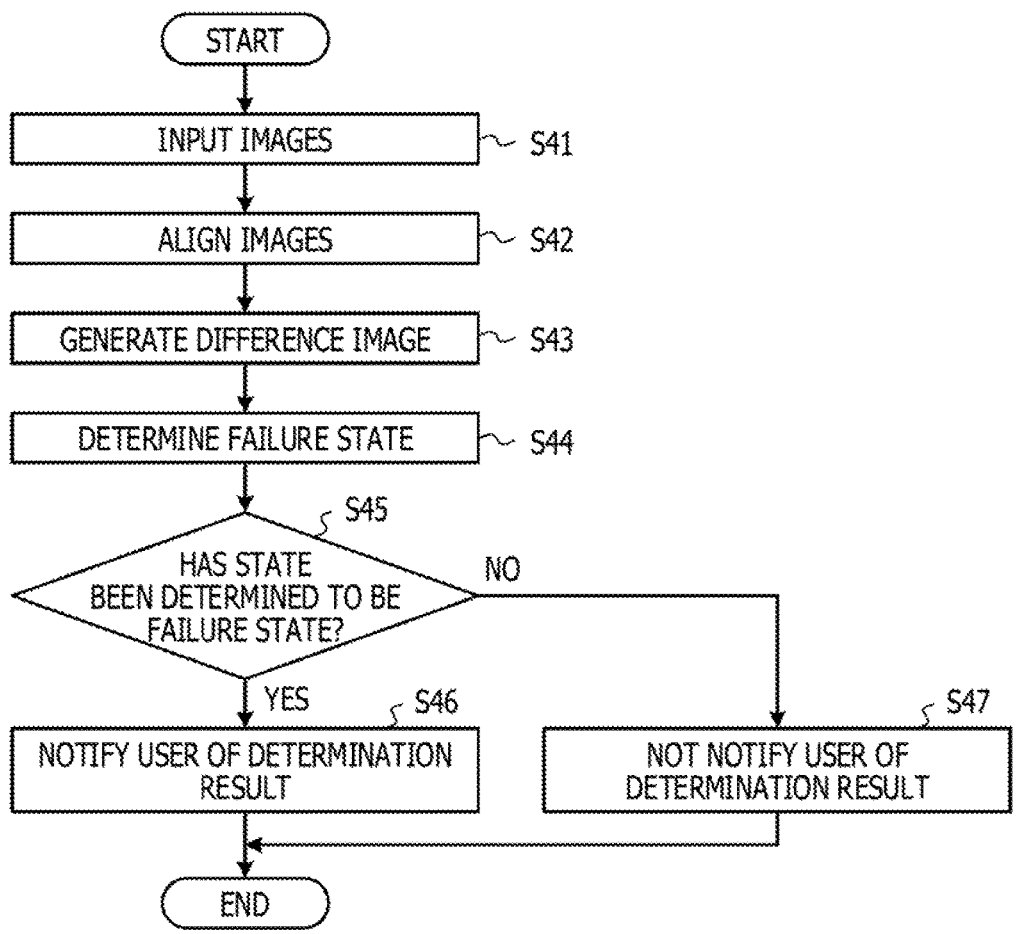
FIG. 14 is a processing flow of the image processing system.

FIG. 14 is a processing flow of the image processing system. In the image processing system 81b, an inspection target image that has been captured by the imaging unit 2a is input to the image processing device 3d (Step S41). The image processing device 3d executes the image alignment processing of the input inspection target image on a sample image stored in the storage unit 25 (Step S42). The image processing device 3d generates a difference image by executing the difference processing between the sample image and the inspection target image after the image alignment processing (Step S43). The image processing device 3d determines a failure state based on a comparison result between the generated difference image and a threshold value that has been set in advance (Step S44). When the image processing device 3d determines a failure state based on the comparison result (Step S45: YES), the image processing device 3d notifies the user of the determination result (Step S46). When the image processing device 3d does not determine the failure state (Step S45: NO), the image processing device 3d does not notify the user of the determination result and ends the failure determination processing (Step S47).

In the above-described processing, the image processing system 81b may execute the failure determination processing of the inspection target image accurately and notify the user of the determination result by executing the image alignment processing according to the embodiment even when a distortion occurs in the inspection target image that has been obtained by the imaging unit 2a.

A computer program that causes a computer to execute the above-described image alignment processing and a non-transitory computer-readable storage medium in which such a program is recorded are included in the range of the technology discussed herein. Here, the non-transitory computer-readable storage medium is, for example, a memory card such as an SD memory card. The computer program is not limited to a program recorded in the recording medium, and may be transmitted through a network or the like such as a telecommunications line, a wireless or wired communication line, or the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable and non-transitory medium storing an image processing program, which causes an image processor to execute a process, the process comprising:
    obtaining a first image and a second image captured at different timings for an identical inspection target or for inspection targets of an identical type by causing the inspection target to pass through an imaging range of an image sensor row;
    extracting feature points of the first image and the second image;
    associating the feature points of the first image and the feature points of the second image with each other, based on feature amounts of the respective extracted feature points;
    estimating a conversion formula to convert the feature point of the second image to the feature point of the first image based on a restraint condition of a quadratic equation, in accordance with respective coordinates of three or more sets of the feature points associated between the first image and the second image, the estimating being performed to compensate for a situation in which the inspection target passes through the imaging range of the image sensor row at a first speed for the first image and at a second speed for the second image, the first and second speeds being different; and
    converting the second image into a third image corresponding to the first image based on the estimated conversion formula.

2. The medium according to claim 1, wherein
in the estimating operation, the conversion formula is estimated based on the restraint condition of the quadratic equation in a vertical direction for the image sensor row and based on a restraint condition of the primary equation in a parallel direction for the image sensor row.

3. The medium according to claim 1, wherein
in the extracting operation, each of the first image and the second image is divided into specific areas in accordance with a degree of change in a passing speed, and feature points included in each of the divided areas are extracted.

4. The medium according to claim 3, wherein
in the dividing operation, the first image is divided at equal distances, and the second image is divided so that feature points corresponding to feature points in each of the divided areas of the first image are included in each of the divided areas of the second image.

5. The medium according to claim 3, wherein
in the dividing operation, the first image is divided so that a specific number or more of feature points are included in each of the divided areas of the first image, and the second image is divided so that feature points corresponding to feature points in each of the divided areas of the first image are included in each of the divided areas of the second image.

6. The medium according to claim 5, wherein
the specific number is determined based on a number of coefficients included in the conversion formula.

7. The medium according to claim 1, wherein the process further comprising;
    generating a difference image between the first image and the third image; and
    displaying the difference image on a display unit.

8. The medium according to claim 1, wherein the process further comprising:
    generating a difference image between the first image and the third image;
    determining a failure state of the difference image based on the difference image and a threshold value; and
    performing output of a notification signal when the failure state is determined.

9. An image processing method of an image processing device, which causes the image processing device to execute a process, the process comprising:

obtaining a first image and a second image captured at different timings for an identical inspection target or for inspection targets of an identical type by causing the inspection target to pass through an imaging range of an image sensor row;

extracting feature points of the first image and the second image;

associating the feature points of the first image and the feature points of the second image with each other, based on feature amounts of the respective extracted feature points;

estimating a conversion formula to convert the feature point of the second image to the feature point of the first image based on a restraint condition of a quadratic equation, in accordance with respective coordinates of three or more sets of the feature points associated between the first image and the second image, the estimating being performed to compensate for a situation in which the inspection target passes through the imaging range of the image sensor row at a first speed for the first image and at a second speed for the second image, the first and second speeds being different; and converting the second image into a third image corresponding to the first image based on the estimated conversion formula.

10. An image processing device comprising:

a memory, and a processor coupled to the memory and configured to execute a process, the process comprising;

obtaining a first image and a second image captured at different timings for an identical inspection target or for inspection targets of an identical type by causing the inspection target to pass through an imaging range of an image sensor row;

extracting feature points of the first image and the second image;

associating the feature points of the first image and the feature points of the second image with each other, based on feature amounts of the respective extracted feature points;

estimating a conversion formula to convert the feature point of the second image to the feature point of the first image based on a restraint condition of a quadratic equation, in accordance with respective coordinates of three or more sets of the feature points associated between the first image and the second image, the estimating being performed to compensate for a situation in which the inspection target passes through the imaging range of the image sensor row at a first speed for the first image and at a second speed for the second image, the first and second speeds being different; and converting the second image into a third image corresponding to the first image based on the estimated conversion formula.

\* \* \* \* \*